Patented Feb. 15, 1927.

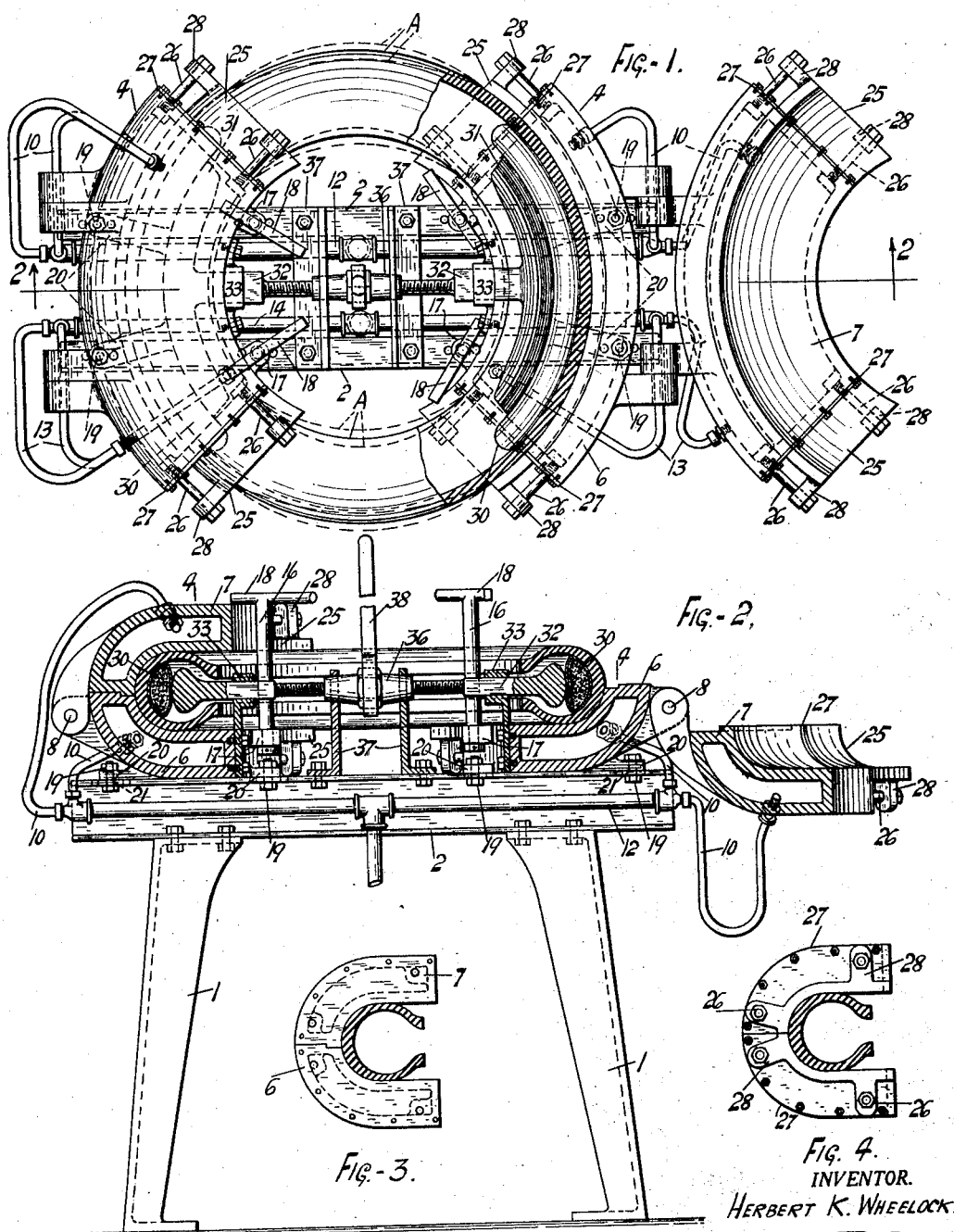

1,617,829

UNITED STATES PATENT OFFICE.

HERBERT K. WHEELOCK, OF AKRON, OHIO.

TIRE-REPAIR VULCANIZER.

Application filed June 16, 1926. Serial No. 116,380.

This invention relates to a new and improved vulcanizer for use in the retreading of automobile tires. The object of the invention is to improve upon previous forms of vulcanizers for this work in the respects which will be more particularly noted and specified.

Prior forms of retreading vulcanizers present disadvantages in that they are not easily adapted for retreading of the different sizes of tires in use at the present time. The vulcanizers in use prior to my invention have been either of the full circle type or of a single segment type. The former type is uneconomical as it can only be used on a single size of tire and a battery of them would be required in every repair shop. The single segment type is not convenient or economical as a pluraltiy of operations are necessary to complete a full retreading operation.

By the improved form of vulcanizer shown herein, a large range of sizes can be retreaded in a single apparatus and only two separate operations are required to completely retread a tire casing. There is thus provided an economical and practical device which is superior to existing forms of retreading apparatus.

Other objects and advantages will be apparent to those familiar with the art to which this invention appertains and as will be pointed out in the specification. The invention is not limited to exact conformity with the details which are shown and described, but is capable of modification and alteration within the scope of the invention as set forth in the claims.

In the drawings:

Figure 1 is a plan view of the improved retreading apparatus showing one portion or side of the device closed and the other open;

Figure 2 is a vertical cross-section on the line 2—2 of Figure 1;

Figure 3 is a detail showing the end of one of the vulcanizing units with the end plate removed; and Figure 4 is a similar view with the end plate in position.

The apparatus is mounted upon legs 1, to the upper surface of which are bolted parallel rails or beams 2 which form a support or base for the curing elements or units. The said elements or units are duplicates and consist of curved curing segments or sections 4 placed opposite to and facing one another. As the units are duplicates of one another, only one will be described.

Each unit comprises a lower section or half 6 and an upper section or half 7 which is pivoted thereto by hinges 8. Each section is chambered for the circulation of steam conducted by flexible piping, indicated at 10, from a steam supply pipe 12 and by flexible piping, indicated at 13, to a drain pipe 14. When closed, as shown to the left in Figures 1 and 2, the sections constitute a cavity for the reception of a tire casing. When opened, as shown to the right, the tire may be removed. The sections are held together by clamps 16 pivoted in lugs 17 on the lower section and provided with cross heads 18 which project over and lock the upper sections in position.

The units are secured to the rails 2 by bolts 19 passing through lugs 20 on the lower sections and into holes 21 in the upper surfaces of the rails. A plurality of holes provides for a wide range of adjustment of the units.

It will be noted that each of the units covers approximately 90° of the entire circumference of a tire casing and, being placed oppositely to one another, it is possible to vulcanize one-half of a tire tread at once. It is, therefore, possible to completely retread or vulcanize a complete tire with two operations. It will also be noted that the sections of the tire between the units are free and it is possible to vulcanize tires of different diameters and cross-sections over a large range, as the flexibility of the tire casings will permit them to be distorted to accommodate themselves to the size and location of the units. This distortion of the tire casing between the units has been indicated in Figure 1 by the three sets of lines A, the center line showing a tire of the dimensions for fitting the units, while the inner and outer lines show how larger or smaller tires, respectively, adapt themselves to the location and size of the vulcanizer units. In this way a large range of sizes may be vulcanized in a single installation, thus reducing the necessary equipment required for the repair shop.

In order to insure that the heat from the steam chambers does not injuriously affect the portion of the tire adjacent to the ends of the units, end plates 25 of the same curvature as the main units are attached thereto by bolts 26, the end plates being insulated from the main units by layers of non-conducting material 27. It will be observed that the bolts 26 pass through lugs 28 projecting from the plates and are open and unenclosed for some distance. This enables the heat from the bolts to radiate and prevents any transmission of heat from the main units to the end plates through the bolts.

To secure the necessary pressure upon the interior of the tire casing, each unit is provided with a flexible core or sand bag 30 which extends the length of the unit and is forced against the interior of the tire casing by a shoe 31, having a central stem 32, guided and supported by a bracket 33 attached to the face of the lower half 6. The two stems are in alignment and are reversely screw-threaded, being connected by a turnbuckle 36 at the center of the apparatus, the turnbuckle being supported in brackets 37 rising from the center portion of the rails 2. A wrench 38 is shown upon the turnbuckle for the purpose of exerting the required pressure upon the tire casing.

The vulcanizer shown herein has many valuable features as has been noted. Other advantages and benefits, including the adaptability of the devices for a large range of sizes and cross-sections of tires, will be apparent to those skilled in the art. It will be understood that changes and modifications may be made in specific embodiments of the invention, within the scope of the claims.

What is claimed is:

1. In an apparatus for the uses and purposes set forth, a base member, and two vulcanizing units mounted upon the base member, each unit extending for substantially 90° of the circumference of the tire, the units facing one another so that approximately one-half of the tire may be vulcanized at a single operation.

2. In an apparatus for the uses and purposes set forth, a base member, and two arc-shaped vulcanizing units mounted upon the base member, the units facing one another so that segments of the tire are left free between them whereby tires of different sizes may distort to adjust themselves to the units.

3. In an apparatus for the uses and purposes set forth, a base member, two vulcanizing units mounted upon the base member, each unit extending for substantially 90° of the circumference of the tire, the units facing one another so that approximately one-half of the tire may be vulcanized at a single operation, and means for exerting pressure upon the tires.

4. In an apparatus for the uses and purposes set forth, a base member, two arc-shaped vulcanizing units mounted upon the base member, the units facing one another so that segments of the tire are left free between them whereby tires of different sizes may distort to adjust themselves to the units, and means for exerting pressure upon those portions of the tire within the units.

5. In an apparatus for the purposes set forth, a base member, segmental vulcanizing units mounted upon the base member, each unit comprising upper and lower sections hinged together, and locking means to hold the sections together, the units being spaced apart so as to leave segments of the tire free to assume any required curvature.

6. In an apparatus for the purposes set forth, a base member, and segmental vulcanizing units mounted upon the base member, each unit being separable to permit the insertion and removal of a tire, the ends of the units being spaced apart so as to leave segments of the tire of sufficient length to permit distortion thereof to assume any required curvature.

7. In an apparatus for the purposes set forth, a base member, segmental vulcanizing units located oppositely to one another upon the base member, and a pressure device located within each unit, the pressure devices being connected to a common actuating member to force them against the interior of the casing, the ends of the units being spaced apart so as to leave segments of the tire of sufficient length to permit distortion thereof to assume any required curvature.

8. In an apparatus for the purposes set forth, a base member, segmental vulcanizing units located oppositely to one another upon the base member, and a pressure device located within each unit, the pressure devices comprising curved shoes fitting within the tire, oppositely screw-threaded stems and a turnbuckle in engagement with the stems.

9. In a tire vulcanizing repair device, a segmental vulcanizing unit and plates at the ends of said unit, insulating layers between the plates and the unit, and bolts extending through lugs on the plates and received in the unit, the shanks of the bolts being spaced from the device to insure radiation therefrom.

10. In an apparatus for the uses and purposes set forth, a base member, and two arc-shaped vulcanizing units mounted upon the base member, the units facing one another so that segments of the tire are left free between them whereby tires of different sizes may distort to adjust themselves to the units, said units being relatively adjustable toward or from each other.

HERBERT K. WHEELOCK.